(12) United States Patent
Hoogeveen

(10) Patent No.: US 7,145,833 B1
(45) Date of Patent: Dec. 5, 2006

(54) CLEANING DEVICE FOR MARINE SEISMIC STREAMERS

(75) Inventor: Jeroen Hoogeveen, Bekkestua (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/227,795

(22) Filed: Sep. 15, 2005

(51) Int. Cl.
*G01V 1/38* (2006.01)
*B08B 9/023* (2006.01)

(52) U.S. Cl. .............................. 367/15; 367/191; 134/6
(58) Field of Classification Search ................. 367/15, 367/153, 154
See application file for complete search history.

(56) References Cited

FOREIGN PATENT DOCUMENTS

FR  2847987 A1 * 6/2004
WO  WO2004/051316  * 6/2004

* cited by examiner

*Primary Examiner*—Ian J. Lobo
(74) *Attorney, Agent, or Firm*—E. Eugene Thigpen; Richard A. Fagin

(57) ABSTRACT

A seismic streamer cleaning device includes a means for converting motion of water past a seismic streamer into movement of the device as the streamer is towed through the water. A cleaning element is cooperatively engaged with the device and an exterior surface of the streamer. In one embodiment, the cleaning element includes brush bristles.

12 Claims, 3 Drawing Sheets

CLEANING DEVICE FOR MARINE SEISMIC STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying apparatus. More specifically, the invention relates to apparatus for cleaning barnacles and other marine contaminants from seismic sensor streamers.

2. Background Art

Marine seismic surveying includes having a seismic vessel tow one or more seismic sensor streamers near the surface of a body of water, such as the ocean. Sensor streamers are essentially cables that include a plurality of seismic sensors (usually hydrophones) disposed along the cable at spaced apart locations. The sensors may be protected from water intrusion by enclosing the cable and the sensors in a water tight, acoustically transparent jacket. The interior of the jacket is typically filled with oil, or electrically non-conductive, viscous gel-like materials, both to enable good acoustic coupling between the water and the hydrophones, and to provide electrical insulation between various electrical components, including the hydrophones, in the streamer.

Typical seismic streamers can extend for a substantial distance behind the towing vessel, often several kilometers. As is the case for many devices operated in a body of water, various marine life forms, such as barnacles and seaweed, can become attached to the exterior of seismic streamers. Other contaminants may also become attached to the exterior of the streamer as well. The presence of such contaminants on a streamer, in addition to causing possible deterioration of the streamer, can cause changes in the response of the various sensors in the streamer because the life forms can interfere with transmission of seismic energy through the jacket and to the sensors therein. Such marine growth or other contaminants may cause noise and increase the drag. Cleaning such contaminants from the exterior of a streamer is therefore important.

Streamers can be cleaned of such attached marine growth or other contaminants using conventional methods such as brushing and scraping. Such conventional cleaning methods typically require the streamer to be retrieved from the water. Retrieval typically includes spooling or winding the streamer on a suitable winch or similar device. The streamer must then be transported to a facility where it may be unspooled and then cleaned conventionally. Such conventional cleaning procedures can be difficult and expensive to perform, and may require that the streamer be removed from service for a considerable period of time. Alternatively, a streamer can be scraped or cleaned manually from a boat moved alongside the streamer while the streamer is deployed in the water. Such cleaning operations can be difficult to perform, dangerous to personnel in the event of unexpected rough water, and, depending on the skill of the cleaning operator, may risk damage to the streamer.

What is needed is a system for cleaning marine growth or other contaminants from the exterior of a seismic streamer while the streamer is being towed by a vessel.

SUMMARY OF THE INVENTION

One aspect of the invention is a cleaning device for a seismic streamer. A cleaning device according to this aspect of the invention includes a housing having at least one external vane thereon. The at least one vane is arranged to cause movement of the housing along an exterior of a seismic streamer as the seismic streamer is towed through a body of water. At least one cleaning element is disposed inside the housing and is cooperatively engageable with an exterior surface of the streamer.

Another aspect of the invention is a cleaning device for a seismic streamer. A cleaning device for a streamer according to this aspect of the invention includes means for converting movement of water past the streamer into movement of the device along the streamer as the streamer is towed in the water. A cleaning element is cooperatively engaged with the device and with an exterior surface of the streamer.

Another aspect of the invention is a method for cleaning a seismic streamer. The method includes towing a seismic streamer in a body of water. Motion of the water past the streamer is converted into movement of a device along the streamer. The movement along the streamer may be both longitudinal and rotational. The rotational motion and longitudinal motion are used to operate a cleaning element in cooperative engagement with the exterior surface of the streamer.

Other aspects and advantages of the invention will be apparent from the following description and the appended claims.

DETAILED DESCRIPTION

Figure 1:
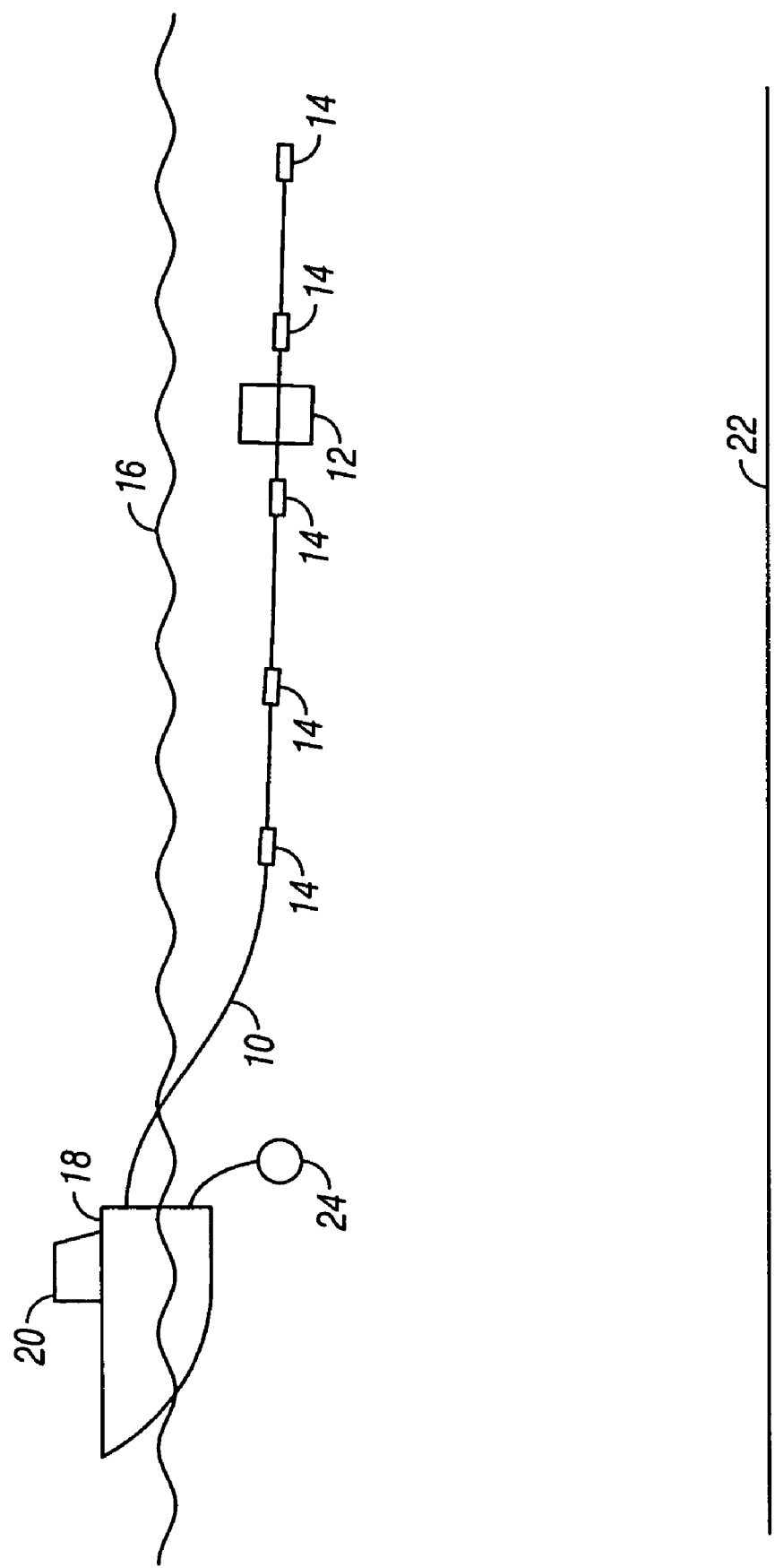
FIG. 1 shows a streamer having one embodiment of an automatic cleaner according to the invention as it is typically used.

FIG. 1 shows an example of an automatic seismic streamer cleaning device as it is typically used on a marine seismic streamer. A seismic vessel 18 tows a marine seismic streamer 10 near the surface of a body of water 16. For purposes of familiarization, the seismic vessel 18 may include thereon various seismic data acquisition, data recording and navigation equipment, shown generally at 20 and collectively referred to as a "recording system", which controls operation of a seismic energy source 24, and records signals detected by various sensors (not shown separately) in the streamer 10. Energy emitted by the source 24 is reflected by various structures (not shown) below the bottom 22 of the body of water 16. Such reflected energy is ultimately detected by the sensors (not shown) on the streamer 10 for recording by the recording system. The example implementation shown in FIG. 1 includes only one streamer, however it is known in the art for a single vessel to tow a plurality of streamers at spaced apart positions behind the vessel. Accordingly, the actual configuration of vessels and streamers is not a limitation on the scope of the invention.

As is known in the art, the streamer 10 typically includes an outer, generally cylindrically shaped jacket which may be made from a flexible, acoustically transparent material such as polyurethane. Inside the jacket, the streamer 10 includes one or more strength members (not shown separately). Coupled to the strength members at spaced apart locations are flotation spacers (not shown separately) which provide the streamer 10 with a selected degree of buoyancy in the water 16. Some of the spacers (not shown) can include therein one or more seismic sensors (not shown separately) which may be hydrophones, geophones or any other sensing device used to detect seismic energy. In a typical streamer, the foregoing components extend for a selected length, usually about 75 meters, in a so called "segment" before being terminated at each axial end thereof with some form of connector. A streamer may be formed from as many as 100 or more such interconnected segments. Thus, the majority of the length of the streamer 10 presents a substantially constant diameter, generally cylindrical exterior surface for application of various devices, including an automatic cleaning device 12 according to the invention.

The streamer 10 includes thereon at selected positions along its length devices known as "compass birds", shown generally at 14 and which will be further explained in more detail. The compass birds 14 each include a device for sensing the compass direction of the streamer 10 at the location of each such compass bird 14, so that the geographic positions of each sensor (not shown) within the streamer 10 can be determined. The compass birds 14 may also include fixed or controllable fins or rudders, as will be explained with reference to FIGS. 2 and 3, to enable maintaining depth and/or direction of the streamer 10 at the position of each compass bird 14. Irrespective of their particular configuration, the compass birds 14 are typically affixed to the outside of the streamer 10, and often represent a size restriction for any other device that operates externally along the streamer 10, including the automatic cleaning device 12.

Figure 2:
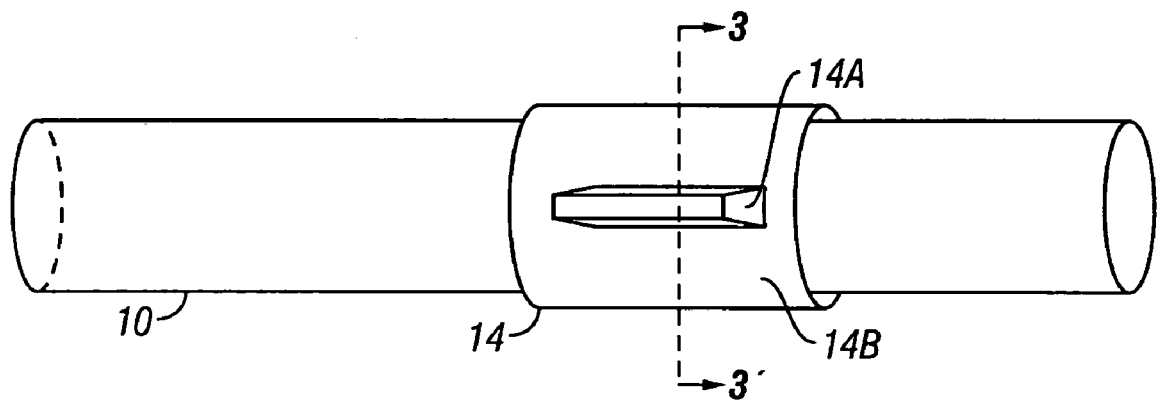
FIG. 2 shows a more detailed section of the streamer in FIG. 1 where a compass bird/float is attached to the exterior of the streamer.

A more detailed view of the compass bird 14 is shown in FIG. 2. The compass bird 14 is shown including a generally cylindrically shaped band 14B that may be affixed to the exterior of the streamer 10 by any conventional means, such as clamping. The compass bird 14 may be formed from a material having a selected degree of buoyancy to operate cooperatively with the streamer 10 to keep the streamer 10 at the selected depth in the water (16 in FIG. 1). The compass bird 14 may include one or more outwardly projecting fins 14A that cooperate with the flow of water past the compass bird 14 to keep the streamer 10 on a substantially level plane during towing in the water (16 in FIG. 1).

Figure 3:
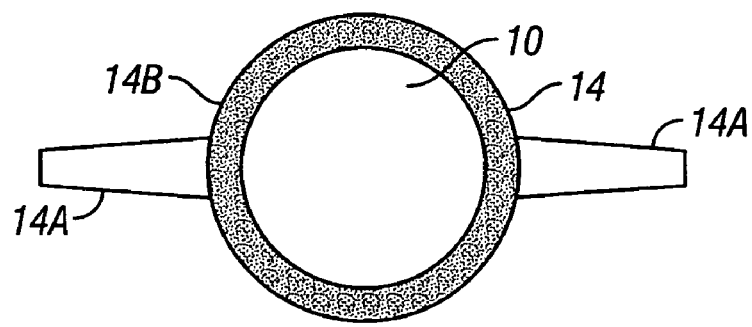
FIG. 3 shows a cross-sectional view of the compass bird of FIG. 2.

A cross-sectional view of the compass bird 14 disposed on the exterior of the streamer 10 is shown in FIG. 3. The particular type of compass bird shown in FIG. 3 has the fins 14A extending to each side of the band 14B. The purpose for showing the compass bird 14 in such detail in FIGS. 2 and 3 is to help explain some of the features in some embodiments of an automatic cleaning device (12 in FIG. 1) according to the invention. As may be inferred from the cross-sectional view of FIG. 3, the fins 14A on the compass bird 14 present a substantial size and shape restriction for an automatic cleaning device. One embodiment of the automatic cleaning device that is intended to be able to pass over compass birds without user intervention will be further explained below with reference to FIGS. 4 and 5.

Generally, automatic seismic streamer cleaning devices according to the invention convert the movement of water past a seismic streamer when the streamer is towed in the water into rotational movement of the cleaning device about the streamer and longitudinal movement of the cleaning device along the streamer. The cleaning device includes a cleaning element operatively engaged with the outer surface of the streamer such that the rotation and longitudinal movement of the cleaning device cause corresponding rotation and longitudinal movement of the cleaning element, thereby cleaning the exterior of the streamer.

Figure 4:
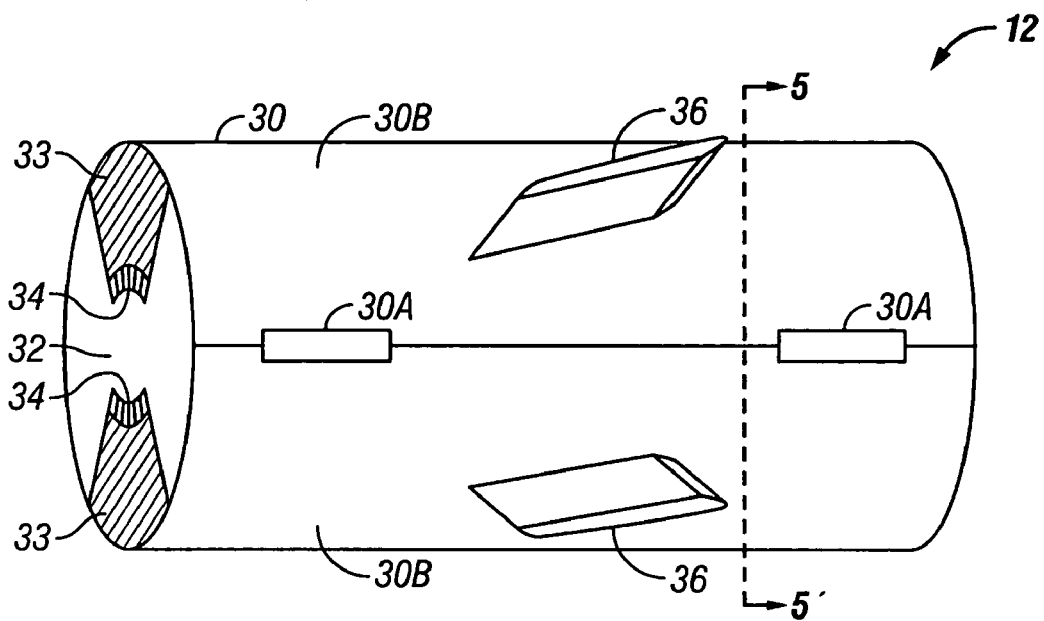
FIG. 4 shows one embodiment of an automatic cleaning device according to the invention.

One embodiment of an automatic cleaning device according to the invention is shown in oblique view in FIG. 4. The automatic cleaning device 12 can include a housing 30 having generally cylindrical exterior shape. The housing 30 can be formed from two longitudinal half cylinders 30B, each about 1 meter in length, that are longitudinally coupled along one side by one or more hinges 30A. By longitudinally coupling the half cylinders 30B on one side using one or more hinges 30A, it is possible to attach the cleaning device 12 to the exterior of the streamer (10 in FIG. 1) without the need to uncouple the streamer (10 in FIG. 1) from the seismic vessel (18 in FIG. 1). The other side of the two half cylinders 30B may be coupled with any suitable latch or releasable fastener. The housing 30 can be formed from steel, aluminum or other high strength material. The housing 30 can have generally thin walls so as to define a relatively large interior space 32. The interior space 32 should be large enough to include at least one cleaning element (explained below).

The housing 30 includes on its exterior one or more vanes 36. The one or more vanes 36 have a surface area and inclination with respect to the longitudinal axis of the housing 30 such that when the streamer (10 in FIG. 1) is moved through the water (16 in FIG. 1), movement of the water past the vanes 36 will impart a selected amount of rotational force and longitudinal force to the housing 30, thus causing the housing 30 to rotate and move longitudinally along the streamer (10 in FIG. 1).

The cleaning device 12 may include within the interior space 32 of the housing 30 two or more laterally opposed inserts 33. The inserts 33 may be made, such as by molding an elastomeric material, for example, polyurethane or rubber. An outer surface of each insert 33 can be formed to conform to the interior surface of the housing 30. A particular manner of coupling the inserts 33 to the interior of the housing 30 will be further explained with reference to FIG. 5. An inner surface of each insert 33 may include a cleaning element 34 affixed thereon, for example, inwardly projecting brush bristles, or scrapers. The inserts 33 and cleaning elements 34 may extend longitudinally over substantially the entire length of the housing 30. In other embodiments, the inserts 33 and cleaning elements may be longitudinally shorter, or segmented longitudinally.

The lateral thickness of the inserts 33 and cleaning elements 34 when combined should be selected such that when the housing 30 is in its closed position, the innermost ends of the cleaning elements 34 can define a substantially cylindrical opening that enables the cleaning elements 34 to cooperatively engage the exterior of the streamer (10 in FIG. 1). The amount of engagement should be sufficient to assure that the cleaning elements 34 effectively clean the exterior of the streamer, but should provide sufficiently low engagement force to enable relatively free movement of the housing 30 along the streamer. The internal diameter of the substantially cylindrical opening of the cleaning elements 34 can thus be slightly smaller than the nominal external diameter of the streamer (10 in FIG. 1) when the inserts 33 and the cleaning elements 34 are not compressed by contact with the streamer. Further, the lateral thickness of the inserts (i.e., the thickness of the inserts extending inwardly from the housing 30) and the stiffness of the cleaning elements 34 need to be selected so that the cleaning element can pass over circumferential obstructions on the streamer cable 10, such as band 14B on compass bird 14.

The cleaning elements 34 may be integrally formed with the inserts 33 or may be separate elements affixed to the inserts 33 with any suitable fastener. During operation, as the housing 30 is moved along the streamer (10 in FIG. 1) and is rotated and moved longitudinally by the force of the moving water acting on the one or more vanes 36, the cleaning elements 34 engage the outer surface of the streamer and are correspondingly rotated and moved longitudinally, thereby cleaning the exterior surface of the streamer of contaminants, such as barnacles and seaweed.

Figure 5:
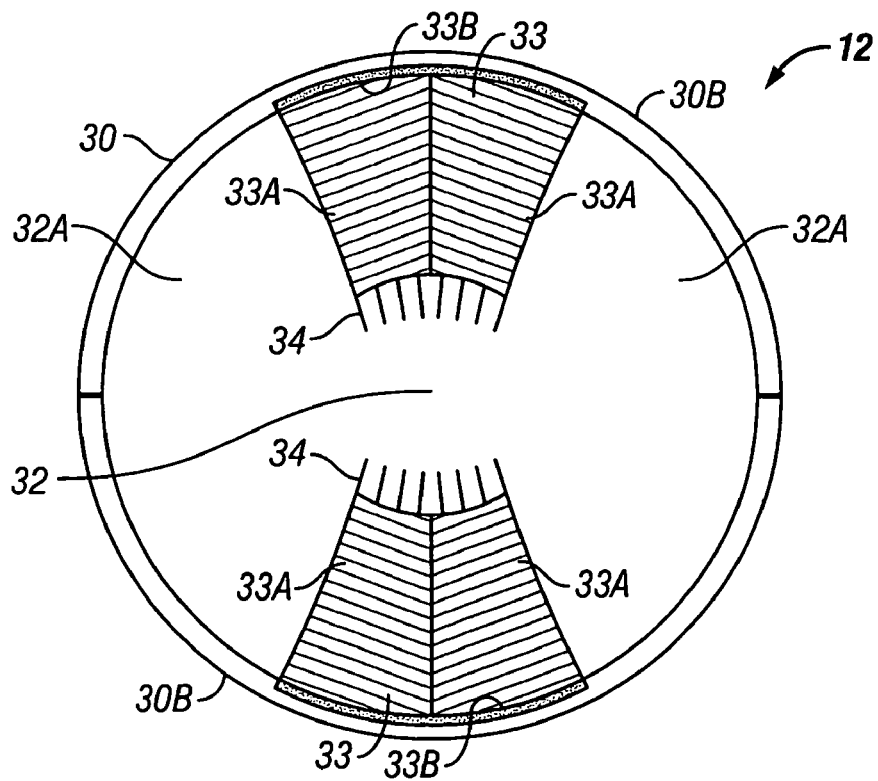
FIG. 5 shows a cross section of the embodiment shown in FIG. 4.

FIG. 5 shows a cross-section of the embodiment of the automatic cleaning device 12 shown in FIG. 4. The inserts 33 can be retained in the housing 30 by forming suitably sized recesses 33B in the interior wall of the housing 30 to match the outer surface of the inserts 33. The exterior surface of each insert 33 will thus be affixed within the corresponding recess 33B by an adhesive or other fastening means known to those of ordinary skill in the art. When in use, the cleaning elements 34 will be maintained in cooperative engagement with the exterior surface of the streamer.

The inserts 33 in the present embodiment extend along only a portion of the circumference of the internal opening 32, thereby creating a circumferential opening 32A between the inserts 33. The purpose for having a circumferential opening is to enable the cleaning device 12 to pass by external obstructions on the streamer, such as the fins 14A on compass birds 14 (explained above with reference to FIGS. 2 and 3). The inserts 33 preferably have generally tapered end faces 33A. The purpose for providing the tapered end faces 33A is to cause the cleaning device to rotate around the fins (14A in FIG. 2) on the compass bird (14 in FIG. 2) during operation of the cleaning device 12, so that the fins 14A will pass through the openings 32A in the cleaning device between the inserts 33.

During operation, as the cleaning device 12 is moved longitudinally along the streamer (10 in FIG. 1) and rotates, the fins (14A in FIG. 2) may present an obstacle to the longitudinal movement of the cleaning device 12. When the tapered faces 33A on the inserts 33 contact the fins (14A in FIG. 2), the tapered faces 33A engage the fins (14A in FIG. 2) to cause the housing 30 to be rotated such that a circumferential opening 32A between the inserts 33 is caused to align with the fins (14A in FIG. 2). By aligning the circumferential opening 32A with the fins (14A in FIG. 2), the cleaning device 12 may pass relatively freely over the compass bird (14 in FIG. 2). After the cleaning device 12 passes over the compass bird (14 in FIG. 2), the cleaning device 12 is free to resume rotation as it moves along the streamer (10 in FIG. 1).

The embodiment of the automatic cleaning device 12 explained above with reference to FIGS. 4 and 5 includes separate housing 30 and inserts 33. A possible advantage of making the housing and inserts as separate components is that the housing 30 may be made from a relatively rigid, high strength material such as steel or aluminum, so as to resist damage, and to minimize flexibility of the vanes (36 in FIG. 4) such that force of the moving water is efficiently transmitted to the vanes 36. At the same time, if the inserts 33 are made from a relatively elastic, compressible material such as rubber, soft polyurethane or similar elastomer, then the inserts 33 can be readily compressed to provide the cleaning device 12 with greater ability to pass over enlarged diameter obstructions along the streamer (10 in FIG. 1). In other embodiments, the housing 30 and inserts 33 may be formed integrally, and from the same or different materials. In still other embodiments, the one or more vanes 36 may be formed from rigid material such as steel or aluminum and molded into an integral housing/insert formed from elastomer or other material. In any of the foregoing variations on the configuration of the cleaning device, the cleaning elements 34 are preferably arranged inside the housing 30 to cooperatively engage the outer surface of the streamer (10 in FIG. 1).

In other embodiments, where the streamer does not include compass birds or other size and shape restrictions, the inserts 33 and/or the cleaning elements 34 may be arranged to cover substantially the entire interior circumference of the housing 30. This is because absent size and shape restrictions on the streamer such as compass birds, it would be unnecessary to provide the circumferential opening 32A.

In other embodiments, the streamer 10 may include compass birds or other attachments that are not symmetrical with respect to the streamer, and modifications will need to be made to the configuration of opening 32A to enable such compass birds or other attachments to pass through housing 30.

Referring again to FIG. 1, to use the cleaning device 12, the housing half cylinders (30B in FIG. 3) are opened, and the cleaning device 12 is affixed to the exterior of the streamer 10 near the seismic vessel 18, preferably at the place where the streamer 10 first enters the water 16. Movement of the seismic vessel 18 and streamer 10 through the water 16 causes the water 16 to move past the cleaning device 12. As explained with reference to FIG. 3, the movement of the water past the housing is transformed into rotary and longitudinal motion of the housing (30 in FIG. 3) by the one or more vanes (36 in FIG. 3). As the housing is moved, the cleaning elements (34 in FIG. 3) are moved correspondingly along the exterior of the streamer 10 to clean the streamer 10 of contaminants. As the cleaning device 12 reaches the end of the streamer 10, it may be removed from the streamer by the user, typically from an auxiliary vessel. Alternatively, the cleaning device 12 may remain on the streamer 10 until the streamer 10 is retrieved from the water 16 onto the seismic vessel 18.

A cleaning device according to the invention can be used to improve the efficiency and safety of maintenance of marine seismic streamers. A cleaning device according to the invention may be used with any number of compass birds or other devices attached to the exterior of the streamer without the need to remove and replace the cleaner. A cleaning device according to the invention has few moving parts, is simple in design and can be affixed to the streamer for operation without retrieving the streamer or disconnecting the streamer from the towing vessel.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer cleaning device, comprising:

a housing adapted for mounting onto a seismic streamer, said housing having at least one external vane thereon, the at least one vane arranged to cause longitudinal and rotational movement of the housing about substantially an entire exterior circumference of a seismic streamer as the streamer is towed through the water; and at least one cleaning element disposed inside the housing and arranged to be cooperatively engageable with an exterior surface of the seismic streamer, the at least one cleaning element arranged in the housing such that the longitudinal and rotational motion of the housing correspondingly longitudinally and rotationally moves the at least one cleaning element.

2. The cleaning device of claim 1 wherein the cleaning element comprises brush bristles.

3. The cleaning device of claim 1 wherein the cleaning element is coupled to the interior of the housing by a resilient material insert.

4. The cleaning device of claim 3 further comprising a plurality of cleaning elements coupled to the interior of the housing by respective inserts, the inserts and cleaning elements covering a limited portion of the circumference of the interior of the housing so as to form a circumferential opening adapted to enable passage over a device on the exterior of the streamer.

5. The cleaning device of claim 4 wherein the circumferential opening is adapted to enable passage over a compass bird.

6. The cleaning device of claim 1 wherein the housing is split longitudinally and comprises at least one hinge to coupled the split housing to enable affixing the device to the seismic streamer while the streamer remains engaged to a towing vessel.

7. A seismic streamer cleaning device, comprising:

means for converting movement of water past a seismic streamer into longitudinal and rotational movement of the device about substantially an entire exterior circumference of the seismic streamer; and a cleaning element operatively engaged with the means for converting and an exterior surface of the seismic streamer such that the longitudinal and rotational motion is transmitted correspondingly to the cleaning element.

8. The cleaning device of claim 7 wherein the cleaning element comprises brush bristles.

9. The cleaning device of claim 7 wherein the means for converting comprises a housing having at least one vane thereon.

10. A method for cleaning a seismic streamer, comprising:

towing the streamer through a body of water;

converting movement of the water past the streamer into longitudinal and rotational movement of a device about substantially an entire exterior circumference of the streamer; and using the movement directly to operate a cleaning element cooperatively engaged with an outer surface of the streamer.

11. The method of claim 10 wherein the cleaning element comprises brush bristles.

12. The method of claim 10 further comprising using the rotational motion cooperatively with an insert in the device to orient the device to enable longitudinal passage of the device over a size restriction on an exterior of the streamer.

* * * * *